United States Patent [19]

Ortwerth et al.

[11] Patent Number: 4,483,006
[45] Date of Patent: Nov. 13, 1984

[54] AXIAL FLOW LASER CAVITY

[75] Inventors: Paul J. Ortwerth, Rio Rancho; Alan I. Lampson, Albuquerque, both of N. Mex.

[73] Assignee: The United States of America as represented by the Secretary of the Air Force, Washington, D.C.

[21] Appl. No.: 375,621

[22] Filed: May 6, 1982

[51] Int. Cl.$^3$ .............................................. H01S 3/22
[52] U.S. Cl. ....................................... 372/58; 372/89; 372/99; 372/103; 372/61; 372/90
[58] Field of Search ..................... 372/58, 103, 89, 90, 372/92, 55, 61, 108, 104; 239/555

[56] References Cited

U.S. PATENT DOCUMENTS

| | | | |
|---|---|---|---|
| 3,302,127 | 1/1967 | Shao-Chi Lin | 372/55 |
| 3,688,215 | 8/1972 | Spencer et al. | 331/94.5 |
| 3,908,175 | 9/1975 | Damm | 331/94.5 G |
| 3,982,208 | 9/1976 | Camac | 331/94.5 |
| 4,048,586 | 9/1977 | Witte et al. | 331/94.5 D |
| 4,095,193 | 6/1978 | Clark | 331/94.5 G |

OTHER PUBLICATIONS

High-Power Gas Lasers, E. R. Pike, Ed., Inst. Phys. Conf. Ser. No. 29, p. 162, (1976).
Connolly et al., "Laser Window and Mirror Materials", Solid State Physics Literature Guides, vol. 9, IFI/Plenum 1977.

Primary Examiner—William L. Sikes
Assistant Examiner—Léon Scott, Jr.
Attorney, Agent, or Firm—Donald J. Singer; Bobby D. Scearce

[57] ABSTRACT

An improved gaseous laser device is provided which comprises a generally tubular laser discharge tube having a laser window at each end thereof, each window disposed at an angle to the lasing axis of the device corresponding substantially to the Brewster's angle characteristic of the material comprising the windows, and including means directing substantially uniform flow of gaseous laser medium into and out of the discharge tube substantially at said angle and means providing a choked gaseous exhaust exit for canceling cavity disturbances within the device. Laser optics defining an optical resonant cavity of the laser device may be disposed external of the discharge tube and windows.

2 Claims, 3 Drawing Figures

AXIAL FLOW LASER CAVITY

RIGHTS OF THE GOVERNMENT

The invention described herein may be manufactured and used by or for the Government of the United States for all governmental purposes without the payment of any royalty.

BACKGROUND OF THE INVENTION

This invention relates generally to gas lasers and laser cavity configurations therefor, and more particularly to a new and improved laser cavity configuration especially applicable to repetitively pulsed chemical or gaseous flow electric discharge lasers.

The present invention provides a novel laser cavity configuration which may be applicable both to chemical lasers, such as the repetitively pulsed HF/DF type, or to gaseous electric discharge type lasers, such as that utilizing carbon dioxide.

Conventional repetitively pulsed high energy lasers employing gaseous flow transverse of the optical axis have associated with their operation transverse acoustic disturbances, such as pressure or shock waves, as an undesirable result of the violent reactions occurring in the laser cavity which produce the desired high energy laser output. These disturbances are reflected off the cavity walls back into the optical cavity causing density gradients in the lasing medium which seriously reduce the optical quality of the laser beam. One known method of reducing the effects of these transverse acoustic disturbances is to employ acoustic attenuators that absorb and dampen the shock waves. However, this approach increases the size, weight, and complexity of the laser. Axial flow of the reactant gases through the laser cavity substantially reduces the effects of these transverse disturbances.

In conventional pulsed gaseous lasers a shock wave is formed in the mixing section of the nozzle through which the reactant gases are injected into the cavity. These lasers are fed by alternating slugs or pulses of gaseous laser reactants and inert gases. The inert gases assist in controlling the reaction in the cavity, i.e., achieving flameout, when a reaction is initiated by flash lamps or other suitable pump devices. The shock waves generate entropy in the mixing section of the injection nozzle. This entropy becomes a signature for each particle which travels through the cavity as a series of spaced disturbances whose spacing correlates to the timing of the pressure history of the laser cavity. These spaced disturbances, called residual entropy disturbances, reduce the beam quality in transverse lasers. However, the effects of these disturbances are minimized in axial flow lasers because the disturbances are lined up perpendicular to the optical axis.

The novel laser device of this invention is configured to utilize axial flow of the gaseous laser medium within the lasing cavity of the device to substantially eliminate the transverse acoustical disturbances which are characteristic of conventional radial or transverse flow configurations and which deleteriously affect their operation. The configuration permits operation at relatively high pressure (two or more atmospheres) in order to reduce laser pulse length and to increase laser energy density. Further, a choked exhaust exit is included to cancel cavity disturbances and acoustic wave reflections into the lasing cavity. The choked exhaust prevents shock waves generated downstream of the laser cavity from being reflected back into the optical cavity, because the exiting gases are traveling at about the speed of sound, and the sonic flow effectively blocks reflections from re-entering the cavity. The choked exit reduces cavity disturbances by allowing the disturbances to leave the optical cavity via the exit opening. Significant reductions in the cavity disturbances can be achieved in the device disclosed herein so long as the cross-sectional area of the exit opening is $\simeq 50\%$ of the cross-sectional area of the lasing cavity.

The laser optics associated with the operation of the device of the present invention may conventionally comprise a window of suitable laser transparent material, disposed at each end of the lasing cavity along the lasing axis thereof and at an angle to the lasing axis corresponding to the Brewster's angle characteristic of the window material. The laser optics (mirrors, output coupler, and the like) which define the optical resonant cavity for laser beam generation may then be disposed externally of the structure defining the lasing cavity, allowing substantial reduction in total system bulk and weight. The laser may then operate with a minimum of optical losses associated with reflection losses by the windows, and, in addition, the laser beam may be polarized in a predetermined direction.

The foregoing characteristics of the laser device of the present invention provides significant advantages over prior art devices in that the need for an acoustic attenuator system downstream of the lasing cavity is eliminated, and cavity volume is reduced, both advantages resulting in significant reduction in total laser system volume and weight without sacrificing total laser power output or efficiency. Laser beam quality is improved by aligning entropy disturbances within the lasing cavity perpendicular to the lasing axis, and allowing them to exit the cavity through the open exhaust; thereby minimizing their effect. Total laser power output may be increased, as compared to existing devices, by reason of shorter pulse, higher energy density operational capability characteristic of the present invention. Additionally, inserting the gaseous reactants into the lasing cavity and exhausting them at about the same angle as that at which the windows are set improves aerodynamic and optical properties of the gaseous flow. The portion of the flow over the windows is advantageous in providing a section for fine scale mixing before the gaseous reactants enter the laser cavity. In addition, this section also provides a length for flame-out between laser pulses in which a noncombustible mixture is inserted. The mass flow utilization is significantly improved over transverse flow lasers by the favorable ratio of the laser cavity volume to the mixing section volume which is an inherent feature of the novel configuration of this invention.

It is, therefore, an object of the present invention to provide an improved gaseous laser device.

It is a further object of the present invention to provide an improved gaseous laser device having substantially improved efficiency and reduced lasing cavity acoustical disturbances associated with laser beam generation.

These and other objects of the present invention will become apparent as the detailed description of representative embodiments thereof proceeds.

SUMMARY OF THE INVENTION

In accordance with the foregoing principles and objects of the present invention, an improved gaseous laser device is provided which comprises, a generally tubular laser discharge tube having a laser window at each end thereof, each window disposed at an angle to the lasing axis of the device corresponding substantially to the Brewster's angle characteristic of the material comprising the windows, and including means directing substantially uniform flow of gaseous laser medium into and out of the discharge tube substantially at said angle, and means providing a choked gaseous exhaust exit for canceling cavity disturbances within the device. Laser optics defining an optical resonant cavity of the laser device may be disposed external of the discharge tube and windows.

DESCRIPTION OF THE DRAWINGS

The present invention will be more clearly understood from the following detailed description of representative embodiments thereof read in conjunction with the accompanying drawings wherein.

DETAILED DESCRIPTION

Figure 1:
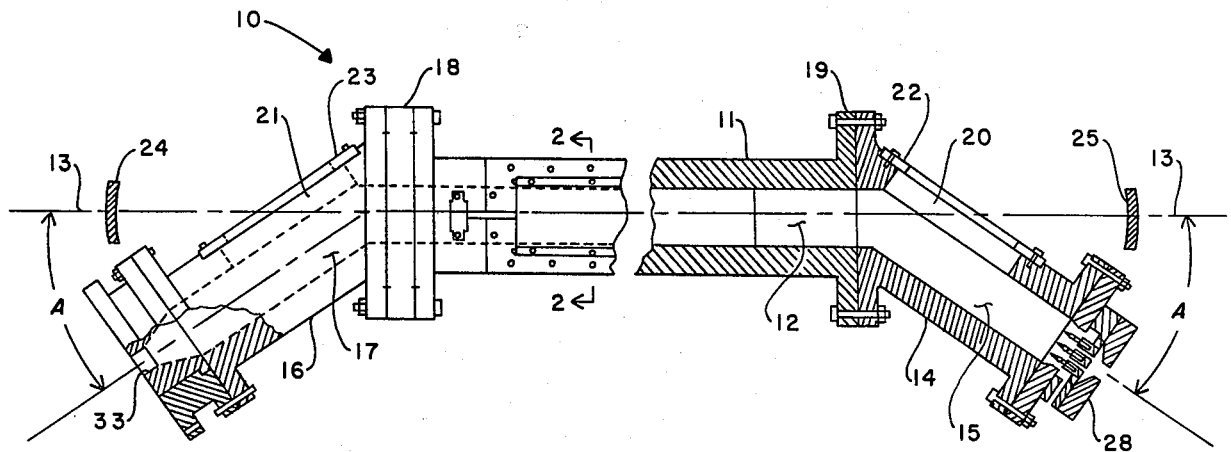
FIG. 1 is a plan view, in partial section, of an embodiment of the present invention in a chemical laser.

Referring now to the accompanying drawings, FIG. 1 presents a plan view, in partial section, of a representative embodiment of the laser cavity configuration of the present invention. The embodiment shown therein is representative of a repetitively pulsed chemical laser, such as the hydrogen-fluorine type, having as a laser initiation means a flashlamp, although the principles governing the construction and operation as described herein are applicable to other type laser configurations, as would appear upon a reading hereof.

The laser device 10 of this invention as represented in FIG. 1 may assume a generally tubular shape comprising a central lasing cavity section 11, defining a lasing cavity 12 and a lasing axis 13 therethrough. In a model constructed, cavity 12 had a cross section of about seven centimeters square and a length of about 200 centimeters for a nominal volume of about 10 liters. Cavity section 11 is joined at one end thereof by inlet section 14 defining gaseous supply and mixing chamber 15 communicating with lasing cavity 12. Cavity section 11 is joined at its other end by outlet section 16 defining outlet chamber 17 also communicating with lasing cavity 12. Inlet section 14 and outlet section 16 may be joined to central cavity section 11 by any appropriate conventional means such as shown in FIG. 1 as flanged joints 18 and 19. Sections 14 and 16 are each configured to join central cavity section 11 at substantially an angle A to lasing axis 13, substantially as shown in FIG. 1, for reasons set forth in detail below. The angle A at which gaseous medium is directed into lasing cavity 12, according to the embodiment described herein, is not critical except that the structure of sections 14 and 16 should preferably allow support of windows 20 and 21 as hereinafter described. Angle A for directing gaseous medium into cavity 12 does however provide desirable geometry for uniform flow of the medium through cavity 12, without substantial separation of the turbulent pipe flow at the corners.

Sections 14 and 16 include, respectively, windows 20 and 21 each of which are disposed at angle A to lasing axis 13 and are sufficiently transparent to transmit a laser beam, generated within lasing cavity 12, along lasing axis 13. Windows 20 and 21 (and sections 14 and 16) are disposed near each end of cavity 12 and relative to lasing axis 13 at angle A which is the complement $(90° - \alpha)$ of the corresponding Brewster's angle $\alpha$ characteristic of the material comprising windows 20 and 21. In a non-limiting representative laser device 10 constructed, calcium fluoride Brewster windows 20 and 21 were used for which the corresponding angle A was about 35.5°. It is noted that the windows 20 and 21 may comprise any suitable laser window material, as would occur to one with skill in the field of this invention. The selected window material will preferably, however, exhibit suitable optical, thermal and physical properties consistent with functional requirements hereunder. Selection of an alternate material for windows 20 and 21 may require a different angle A, at which the windows are disposed relative to lasing axis 13 in laser device 10. For example, for sapphire a corresponding angle A is about 31.10°. Other window materials suitable for use in laser device 10 may include strontium fluoride, quartz, sodium chloride, and magnesium fluoride for which the respective corresponding values for angle A (complement of Brewster angles) are 36°, 35.5°, 32.7°, and 37.3°. Windows 20 and 21 may be retained in place conventionally as by retaining rings or clamps 22 and 23, respectively. External cooling, as by a cooled helium purge (not shown in the drawings), may be provided to the windows 20 and 21, if desired.

The novel laser device 10 configuration as presented in FIG. 1 allows placement of the laser optics, which define the optical resonant cavity for the operational device, external of the laser device 10. Therefore the associated optics may be represented schematically as shown in FIG. 1 as laser mirror 24 and output coupler 25.

Figure 2:
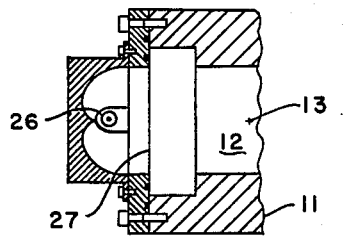
FIG. 2 is an enlarged partial cross-sectional view of a portion of the lasing cavity section of the embodiment of FIG. 1 taken along line 2—2 thereof.

Referring now additionally to FIG. 2, presented therein is a cross-sectional view of a portion of central lasing cavity section 11 taken substantially along lines 2—2 of FIG. 1. For the representative embodiment presented in the accompanying drawings, viz. a chemical laser, the energy source for pumping laser device 10 and sustaining a laser discharge therein comprises one or more flashlamps 26 disposed adjacent cavity 11. In the laser device 10 constructed, four 50 cm long flashlamps 26 were used (two each adjacent opposing sides of cavity 12), each driven by a 300 joule capacitor in a 2 $\mu$s pulse (not shown in the drawings). Transparent quartz windows 27 were used to hermetically separate flashlamps 26 from lasing cavity 12.

Figure 3:
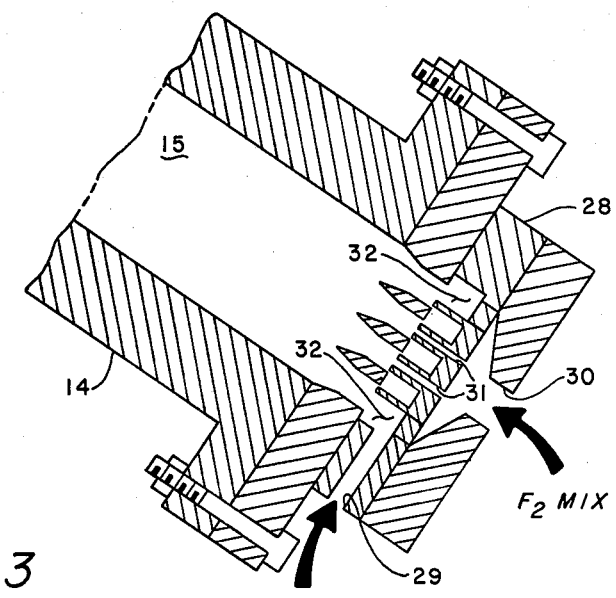
FIG. 3 is a view on enlarged scale of a representative gaseous reactant manifold inlet means for the specific embodiment of FIG. 1.

The gaseous reactants for laser 10 operation may be fed into mixing chamber 15 of inlet section 14 through conventional inlet/manifold means 28 shown schematically in enlarged scale in FIG. 3. The laser gases may be fed into laser device 10 in any appropriate quantity and composition of reactants, for example, a hydrogen/deuterium/helium mix and a fluorine/helium mix (with other inert gases constituting suitable lasing medium) through inlet ports 29 and 30 substantially as shown in FIG. 3. The gaseous feed may be conventionally supplied and mixed by any suitable means from separate gas storage (not shown) to achieve the desired gaseous mixtures. Manifold 28 may, as shown in FIG. 3, comprise a plurality of mixing channels, such as centrally disposed channels 31 communicating with inlet port 30 to supply $F_2$ mix, and channels 32 for communicating with inlet port 29 to supply the $H_2/D_2$ mix.

The outlet section 16 of FIG. 1 may include an outlet port 33 of substantially reduced cross section in order to maintain gas pressure within lasing cavity 12 during laser operation involving gas flow through the cavity along lasing axis 13. In the nonlimiting device constructed, outlet port 33 comprised a single outlet opening communicating with exhaust means (not shown). Port 33 was about 25 $cm^2$ in cross section which represented an approximate 50% flow restriction as compared to the cross section of chamber 17. This allowed a desirable cavity 12-to-exhaust pressure ratio of greater than about 2, and substantially eliminated acoustic wave reflections.

Laser 10 device as represented herein is designed to operate at about 50 Hertz for about one second. No cooling of the lasing cavity section 11 is normally required, although operation time is therefore limited. The cavity pressure (within cavity 12) may be maintained to about two atmospheres (30 psia) prior to reaction initiated by flashlamps 26. During reaction (lasing), the pressure within laser device 10 may rise in short pulses to about 10 to 20 atm, depending on the gaseous reactants used, and, therefore, the structure of cavity section 11, inlet section 14, outlet section 16, and windows 20 and 21 must have sufficient strength to withstand these pulses.

It is recognized that, although the foregoing description is centered around an improved laser device of the gaseous chemical reactant type, the novel configuration of this invention may be adapted with success to lasers of other types. It is, therefore, understood that the embodiment described herein is not all inclusive of the variations that might occur to one with skill in the field of this invention. Other embodiments are contemplated hereunder and may be developed without departing from the spirit of this invention or from the scope of the appended claims.

We claim:

1. In an improved pulsed gas laser device which includes:
   a. a generally tubular laser discharge tube defining a laser discharge cavity therein and lasing axis therethrough;
   b. a laser window disposed near each end of said laser discharge cavity along said lasing axis, each of said windows disposed at an angle to said lasing axis corresponding substantially to the complement of the Brewster angle characteristic of the material comprising said windows;
   c. means defining an optical resonant cavity along said lasing axis; and means for sustaining a laser discharge within said laser discharge cavity, the improvement comprising:
   d. means for supplying substantially uniformly mixed gaseous laser medium to said laser discharge cavity near one end thereof by substantially uniform flow directed into said cavity at substantially said angle, and means for exhausting said gaseous medium from said laser discharge cavity at substantially said angle, said exhaust means having a choked exhaust exit which cancels cavity disturbances and acoustic wave reflections in the lasing cavity such that shock waves generated downstream of said lasing cavity are not reflected back into said cavity in that the exciting gases are traveling at about the speed of sound and the sonic flow blocks such reflection from re-entering said laser discharge cavity.

2. The laser device as recited in claim 1 wherein said windows comprise a material selected from the group consisting of calcium fluoride, sapphire, strontium fluoride, quartz, sodium chloride, and magnesium fluoride.

* * * * *